C. P. MORAN.
MINE AMBULANCE.
APPLICATION FILED MAY 20, 1914.
1,115,560.  Patented Nov. 3, 1914.
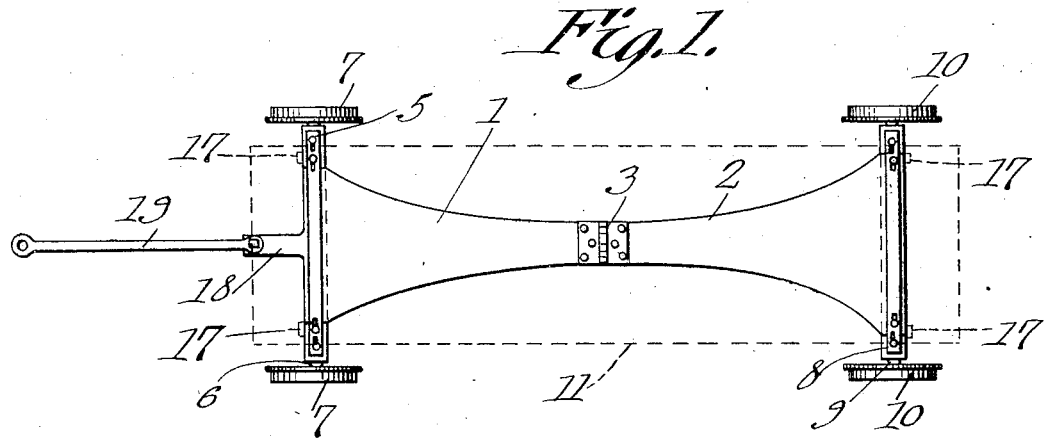
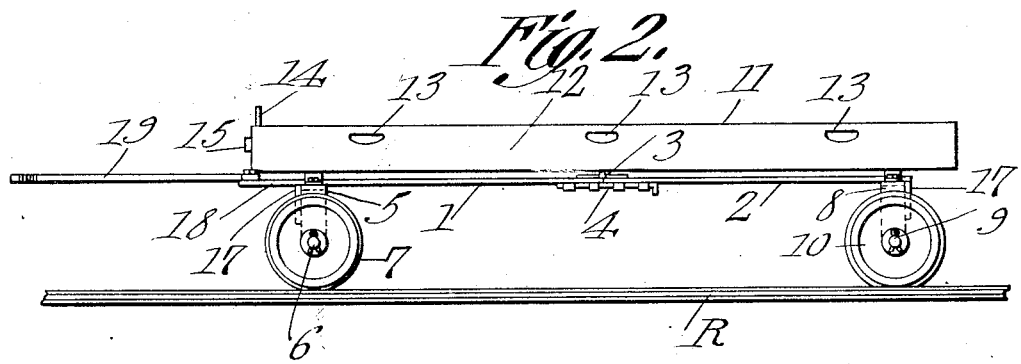
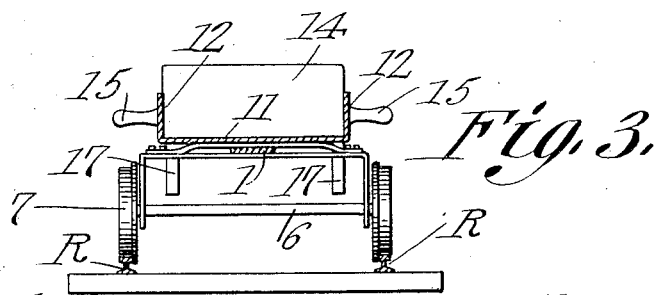
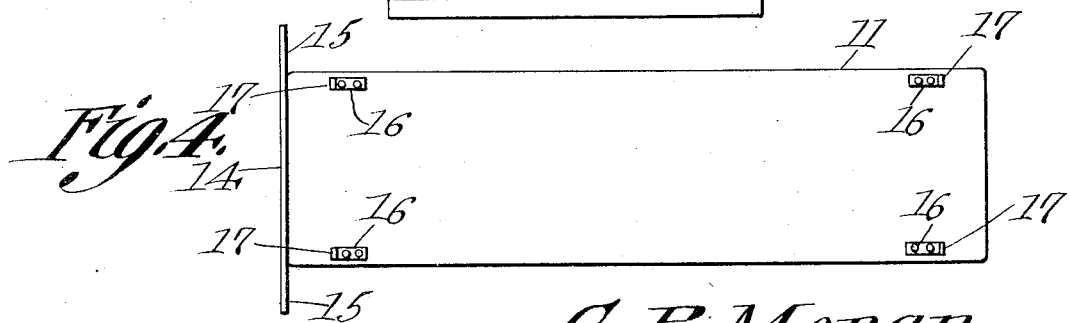
Witnesses
C. P. Moran, Inventor
by C. A. Snow & Co.
Attorneys

UNITED STATES PATENT OFFICE.

CORNELIUS P. MORAN, OF TUNNELHILL, PENNSYLVANIA.

MINE-AMBULANCE.

1,115,560.

Specification of Letters Patent.

Patented Nov. 3, 1914.

Application filed May 20, 1914. Serial No. 839,827.

*To all whom it may concern:*

Be it known that I, CORNELIUS P. MORAN, a citizen of the United States, residing at Tunnelhill, in the county of Cambria and State of Pennsylvania, have invented a new and useful Mine-Ambulance, of which the following is a specification.

The present invention relates to improvements in mine ambulances, one object of the invention being the provision of a compact portable ambulance adapted to be readily placed upon the mining track or rails in a mine, and assembled so that a couch or body carrying member may be properly seated thereupon to be transported to a point of safety.

A further object of the present invention, is the provision of a mine ambulance, in which the carrying member is composed of two hinged sections whereby the sections may be collapsed and the ambulance when in use occupy a small amount of space, the same being readily extended and locked in such extended position during the reception of the stretcher or couch and the transportation of the amubulance.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of the complete carrier member, dotted lines illustrating the position of the couch or stretcher member thereupon. Fig. 2 is a side elevation of the complete ambulance. Fig. 3 is a cross section taken through the rear section of the carrier with the couch member thereupon. Fig. 4 is a bottom plan view of the stretcher or couch member removed.

Referring to the drawings, the numerals 1 and 2 designate the two sections which constitute the platform of the carrier member, said sections being hinged as at 3 so that the same may be readily collapsed or extended as illustrated, the locking bolt 4 being disposed upon the under side of the members adjacent the hinge thereof so as to lock the hinged portion rigid.

Connected to the forward end of the member 1 is the axle carrying member 5, in whose terminals is properly journaled the axle 6 carrying the flanged rail engaging wheel 7. The spindle or axle carrying member 8 is attached to the opposite end of the member 2 and in its terminals is journaled the axle 9 which carries the flanged rail engaging wheel 10. A stretcher or body carrying member 11 is provided with the two longitudinal upstanding walls 12, each one of which is provided with the hand holes 13, as clearly illustrated in Fig. 2. At the forward end of the member 11 disposed transversely thereof, is a board 14 which is provided with the oppositely disposed gripping ends 15, thus providing a means whereby the stretcher or body carrying member may be readily placed upon the wheeled carriage.

In order to hold the member 11 in proper position upon the carrying member, the members 17 are attached as at 16 to the under side thereof and such members 17 are disposed to depend and engage the respective outer edges of the axle carrying members 5 and 8, and thus hold the body carrying member or stretcher against longitudinal movement when properly positioned upon the wheeled carrier. By this means it is necessary that the body carrying member be elevated so that the lower ends of the depending members 17 are moved above the respective axle carrying members 5 and 8 before the body carrying member may be removed as a stretcher or couch.

Carried at the forward end of the member 1 is an extension 18, to which is connected a link or handle 19, by means of which the ambulance may be properly pulled or transported upon the rails R into and out of the mine when necessary.

What is claimed is:

1. A mine ambulance, including two V-shaped members, a hinge connecting the reduced terminals of such members together, a bolt for locking the reduced ends of said members against collapse, two axle carrying members attached to the two hinged members, an axle carried by each of said members, two flanged rail engaging wheels carried by each axle, a body carrier, and means for holding the body carrier upon the two axle carrying members and against longitudinal movement.

2. A mine ambulance, including two substantially V-shaped members, the apices of which are hingedly connected together for extension and collapse, two substantially U-shaped axle members connected to the base of the V-shaped member, an axle mounted in each of said latter members, two flanged wheels carried by each axle, a portion of the respective axle carrying members being projected beyond the base portion of the V-shaped members, a stretcher, and means depending from the bottom of said stretcher for engagement with the axle carrying members to hold the stretcher upon the two V-shaped members and against longitudinal movement.

In testimony that I claim the foregoing as my own, I have hereto affixed my signature in the presence of two witnesses.

CORNELIUS P. MORAN.

Witnesses:
 PATRICK PLUNKETT,
 NORMAN E. WILT.